United States Patent
Kandachar Sridhara Rao et al.

(10) Patent No.: US 11,824,874 B2
(45) Date of Patent: Nov. 21, 2023

(54) APPLICATION SECURITY ENFORCEMENT

(71) Applicant: VMWARE, INC., Palo Alto (IN)

(72) Inventors: Sudarshana Kandachar Sridhara Rao, Bangalore (IN); Raghav Kempanna, Bangalore (IN); Rajagopal Sreenivasan, Bangalore (IN); Kumara Parameshwaran, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 231 days.

(21) Appl. No.: 17/239,530

(22) Filed: Apr. 23, 2021

(65) Prior Publication Data

US 2022/0232020 A1 Jul. 21, 2022

(30) Foreign Application Priority Data

Jan. 20, 2021 (IN) .............................. 202141002706

(51) Int. Cl.
*H04L 9/40* (2022.01)

(52) U.S. Cl.
CPC ...... *H04L 63/1416* (2013.01); *H04L 63/0236* (2013.01); *H04L 63/0876* (2013.01); *H04L 63/1425* (2013.01); *H04L 63/1466* (2013.01); *H04L 63/20* (2013.01)

(58) Field of Classification Search
CPC ............. H04L 63/1416; H04L 63/0236; H04L 63/0876; H04L 63/1425; H04L 63/1466; H04L 63/20
See application file for complete search history.

(56) References Cited

U.S. PATENT DOCUMENTS

| | | | | |
|---|---|---|---|---|
| 9,495,188 | B1 * | 11/2016 | Ettema | H04L 63/0245 |
| 10,027,689 | B1 * | 7/2018 | Rathor | H04L 63/1416 |
| 10,038,711 | B1 * | 7/2018 | Gorodissky | H04L 63/20 |
| 10,148,693 | B2 * | 12/2018 | Singh | G06F 21/00 |
| 10,581,874 | B1 * | 3/2020 | Khalid | H04L 63/1425 |

(Continued)

OTHER PUBLICATIONS

"Center for Applied Internet Data Analysis", Retrieved on Apr. 22, 2021 at <URL: https://www.caida.org/research/traffic-analysis/classification-overview/>, CAIDA.

(Continued)

*Primary Examiner* — Darren B Schwartz
(74) *Attorney, Agent, or Firm* — SU IP CONSULTING (57) ABSTRACT

Example methods and systems for application security enforcement are described. In one example, a computer system may detect, from a client device, a packet requiring processing by a first server pool; and determine whether the packet is associated with a security attack. In response to determination that the packet is not associated with the security attack, the packet may be steered towards the first server pool to cause processing of the packet by one of multiple first application servers. Otherwise, the packet may be steered towards a second server pool to cause processing of the packet by one of multiple second application servers and to learn attack information associated with the security attack. The multiple second application servers in the second server pool may be capable of mimicking behavior of the multiple first application servers in the first server pool.

18 Claims, 7 Drawing Sheets

(56) References Cited

U.S. PATENT DOCUMENTS

| | | | | |
|---|---|---|---|---|
| 2004/0172557 | A1* | 9/2004 | Nakae | H04L 63/20 726/22 |
| 2006/0242701 | A1* | 10/2006 | Black | H04L 63/1441 726/22 |
| 2010/0202299 | A1* | 8/2010 | Strayer | H04L 63/1408 370/252 |
| 2016/0028764 | A1* | 1/2016 | Vasseur | H04L 63/1416 726/23 |
| 2017/0093910 | A1* | 3/2017 | Gukal | H04L 63/1416 |
| 2017/0134423 | A1* | 5/2017 | Sysman | G06F 21/554 |
| 2018/0131716 | A1* | 5/2018 | Chantz | H04L 63/1425 |
| 2020/0067981 | A1* | 2/2020 | Ramachandra | H04L 63/1425 |
| 2022/0046036 | A1* | 2/2022 | Bastawala | G06F 11/3006 |

OTHER PUBLICATIONS

Pauline Bowen et al., "Information Security Handbook: A Guide for Managers", Recommendations of the National Institute of Standards and Technology, Oct. 2006.

"Help Stop Spammers Before They Even Get Your Address!" Project Honey Pot, Retrieved on Apr. 22, 2021 at <URL: https://www.projecthoneypot.org/>.

"Passive Spam Block List", Spamikaze, Retrieved on Apr. 22, 2021 at <URL: https://psbl.org/>.

"The Ultimate Server Protection Suite", BitNinja Server Security, Retrieved on Apr. 22, 2021 at <URL: https://bitninja.io/>.

Retrieved on Apr. 23, 2021 at <URL: http://w3af.org/>.

Last edited by Ryan Barnett, "The Web Application Security Consortium", Distributed Web Honeypots, Retrieved on Apr. 23, 2021 at <URL: http://projects.webappsec.org/w/page/29606603/Distributed%20Web%20Honeypots>.

OWASP Foundation, the Open Source Foundation for Application Security, Retrieved on Apr. 23, 2021 at <URL: https://owasp.org/>.

"ModSecurity", SpiderLabs, Retrieved on Apr. 23, 2021 at <URL: https://github.com/SpiderLabs/ModSecurity>.

Smokescreen Team, "Open Source Honeypots That Detect Threats For Free", Retrieved on Apr. 23, 2021 at <URL: https://www.smokescreen.io/practical-honeypots-a-list-of-open-source-deception-tools-that-detect-threats-for-free/>.

"Snare", Mushorg, Retrieved on Apr. 23, 2021 at <URL: https://github.com/mushorg/snare>.

"OWASP ModSecurity Core Rule Set—The 1st Line of Defense Against Web Application Attacks", OWASP, Retrieved on Apr. 23, 2021 at <URL: https://owasp.org/www-project-modsecurity-core-rule-set/>.

"How to Write a WAF Rule—Modsecurity Rule Writing", Kemp Support, Updated on Feb. 7, 2020, Retrieved on Apr. 23, 2021 at <URL: https://support.kemptechnologies.com/hc/en-us/articles/209635223-How-to-write-a-WAF-rule-Modsecurity-Rule-Writing>.

* cited by examiner

APPLICATION SECURITY ENFORCEMENT

RELATED APPLICATIONS

Benefit is claimed under 35 U.S.C. 119(a)-(d) to Foreign Application Serial No. 202141002706 filed in India entitled "APPLICATION SECURITY ENFORCEMENT", on Jan. 20, 2021, by VMware, Inc., which is herein incorporated in its entirety by reference for all purposes.

BACKGROUND

Virtualization allows the abstraction and pooling of hardware resources to support virtual machines in a software-defined network (SDN) environment, such as a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, multiple application servers may be deployed in the SDDC to process incoming packets (e.g., service requests) from various client devices. It is desirable to protect application servers from security attacks.

DETAILED DESCRIPTION

According to examples of the present disclosure, application security enforcement may be improved by indulging attackers and attack traffic instead of merely blocking all attack traffic. In one example, a computer system (see 110 in FIG. 1) may detect, from a client device, a packet requiring processing by a first server pool (see 130 in FIG. 1) and determine whether the packet is associated with a security attack. In response to determination that the packet is not associated with the security attack, the packet may be steered towards the first server pool to cause processing of the packet by one of multiple first application servers (denoted as Si, where i=1, . . . , N in FIG. 1).

Otherwise, in response to determination that the packet is associated with the security attack, the packet may be steered towards a second server pool (see 140 in FIG. 1) to cause processing of the packet by one of multiple second application servers and to learn attack information associated with the security attack. The multiple second application servers (denoted as Hj, where j=1, . . . , M) in the second server pool may be capable of mimicking behavior of the multiple first application servers in the first server pool. This way, examples of the present disclosure may indulge an attacker while isolating the packet (i.e., attack traffic) from the first server pool.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Throughout the present disclosure, it should be understood that although the terms "first" and "second" are used to describe various elements, these elements should not be limited by these terms. These terms are used to distinguish one element from another. A first element may be referred to as a second element, and vice versa.

Figure 1:
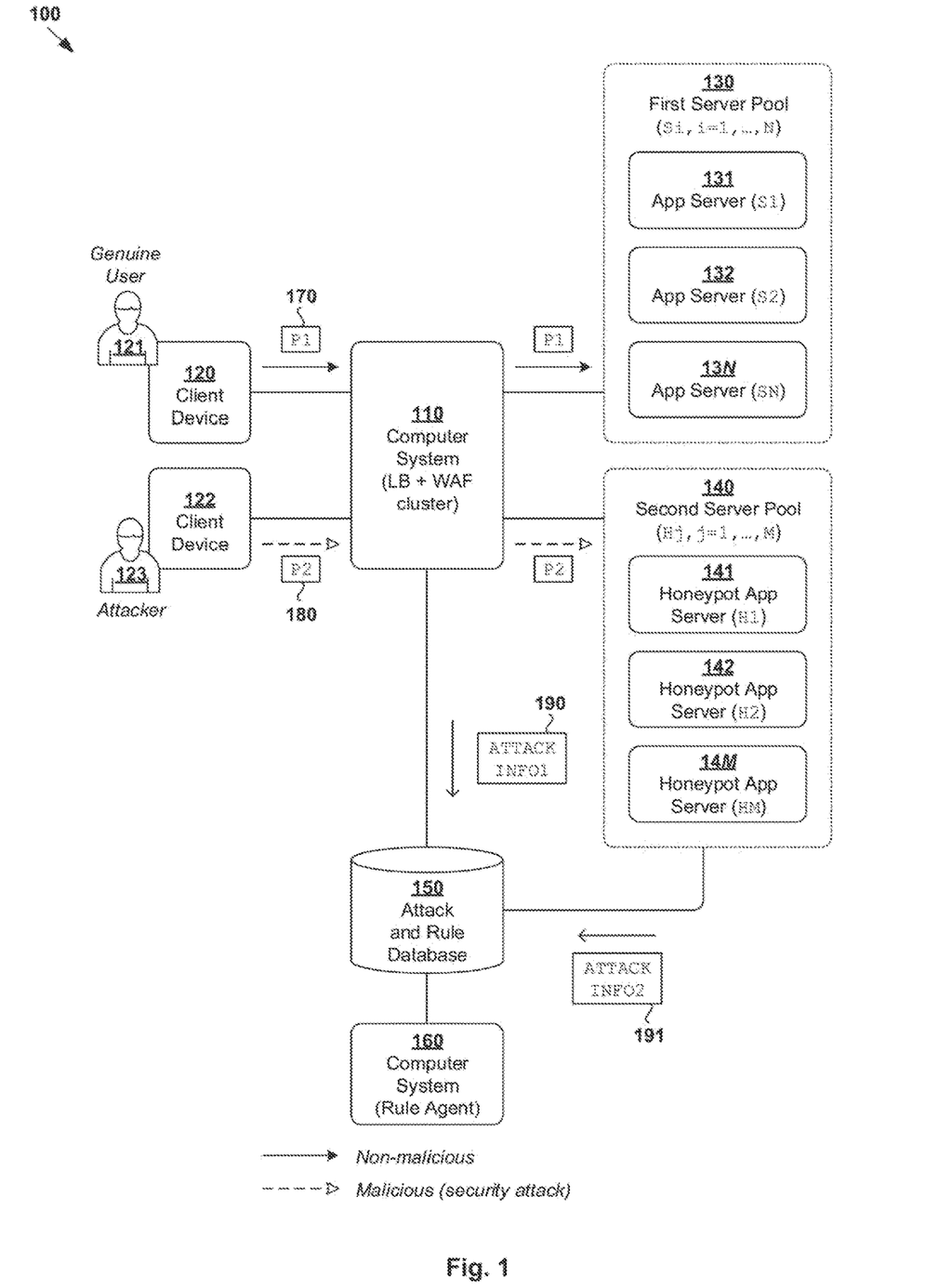
FIG. 1 is a schematic diagram illustrating an example network environment in which application security enforcement may be performed.

In more detail, FIG. 1 is a schematic diagram illustrating an example network environment 100 in which application security enforcement may be performed. It should be understood that network environment 100 may include additional and/or alternative components than that shown in FIG. 1. In this example, network environment 100 may include computer system 110 that is configured to steer incoming packets (e.g., service requests) originating from client device 120/122 towards suitable application servers for processing. First client device 120 may be operated by genuine user 121, and second client device 122 by attacker 123 to initiate a security attack.

Conventionally, an early detection and blocking strategy is implemented. This involves matching incoming packets against a set of firewall rules to detect and block malicious packets, such as from attacker 123 operating second client device 122. In various scenarios, such conventional approach works well to protect application server(s) from security attacks. However, blocking all attack traffic deprives the opportunity to learn more about the attacker's strategy to further improve application security enforcement in network environment 100.

Instead of merely blocking all malicious traffic according to the conventional approach, examples of the present disclosure may be implemented to (selectively) indulge attackers and attack traffic. In the example in FIG. 1, computer system 110 may be configured to steer incoming packets towards either first server pool 130 or second server pool 140. Here, first server pool 130 may include multiple (N) first application servers (see 131-13N) denoted as Si, where i=1, . . . , N. Second server pool 140 may include (M) second application servers (see 141-14M) denoted as Hi, where j=1, . . . , M. Second application servers 141-14M (also referred to as "honeypot" application servers below) in second server pool 140 are capable of mimicking the behavior of first application servers 131-13N in first server pool 130.

To handle incoming packets, computer system 110 may be an application delivery controller (ADC) that supports a cluster of any suitable number of load balancer and web application firewall (WAF). In practice, computer system 110 may provide application acceleration and perform load balancing functions for first application servers 131-13N and second application servers 141-14M. These functions may be provided at different networking layers of a networking stack, such as layer 3 to layer 7. Computer system 110 may be an enforcement point for application security, thereby acting as a barrier between user access network(s) and application servers.

Figure 2:
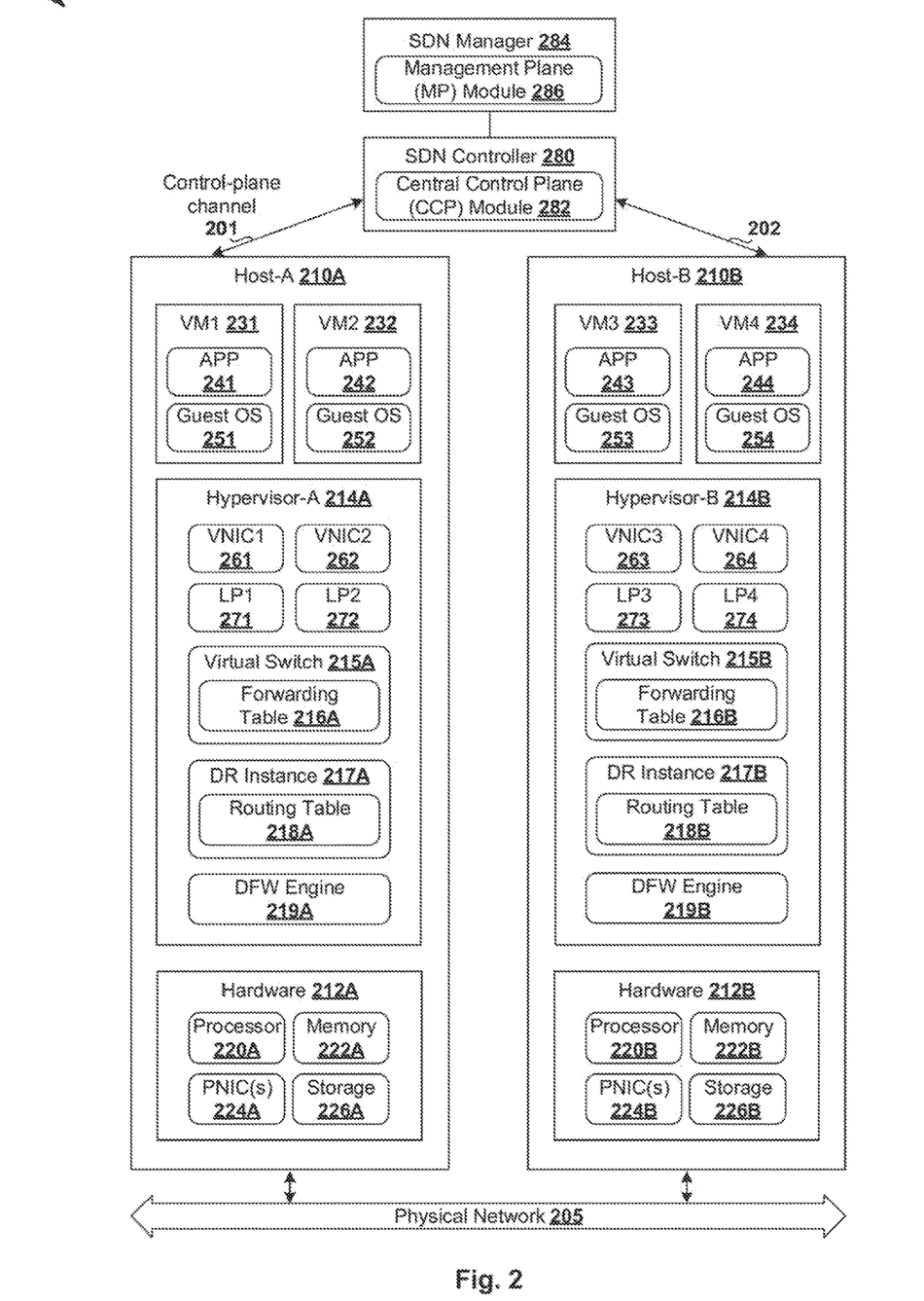
FIG. 2 is a schematic diagram illustrating an example physical implementation view of a software-defined networking (SDN) environment.

Referring also to FIG. 2, computer system 110, first application servers 131-13N, second application servers 141-14M and rule agent 160 may each be implemented using physical (bare metal) machines and/or virtual machines (VMs). Some example VMs are shown in FIG. 2, which is a schematic diagram illustrating an example physical implementation view of software-defined networking (SDN) environment 200. Here, SDN environment 200 may include various hosts 210A-B (two shown for simplicity). Each host 210A/210B may include suitable hardware 212A/212B and virtualization software (e.g., hypervisor 214A/214B) to support VMs 231-234. Hardware 212A/212B includes suitable physical components, such as central processing unit(s) (CPU(s)) or processor(s) 220A/220B; memory 222A/222B; physical network interface controllers (PNICs) 224A/224B; and storage disk(s) 226A/226B, etc.

Hypervisor 214A/214B maintains a mapping between underlying hardware 212A/212B and virtual resources allocated to respective VMs. Virtual resources are allocated to respective VMs 231-234 to support a guest operating system (OS; not shown for simplicity) and application(s); see 241-244, 251-254. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 231-234, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

SDN controller 280 and SDN manager 284 are example management entities in network environment 100. One example of an SDN controller is the NSX controller component of VMware NSX® (available from VMware, Inc.) that operates on a central control plane (see module 282). SDN controller 280 may be a member of a controller cluster (not shown for simplicity) that is configurable using SDN manager 284 (see module 286). Management entity 280/284 may be implemented using physical machine(s), VM(s), or both. To send or receive control information, a local control plane (LCP) agent (not shown) on host 210A/210B may interact with central control plane (CCP) module 282 at SDN controller 280 via control-plane channel 201/202.

Through virtualization of networking services in network environment 100, logical networks (also referred to as overlay networks or logical overlay networks) may be provisioned, changed, stored, deleted and restored programmatically without having to reconfigure the underlying physical hardware architecture. Hypervisor 214A/214B implements virtual switch 215A/215B and logical distributed router (DR) instance 217A/217B to handle egress packets from, and ingress packets to, corresponding VMs. In Network environment 100, logical switches and logical DRs may be implemented in a distributed manner and can span multiple hosts. A logical switch may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables 218A-B at respective DR instances 217A-B. Routing tables 218A-B may each include entries that collectively implement the respective logical DRs (to be discussed further below).

Packets may be received from, or sent to, each VM via an associated logical port. For example, logical switch ports 271-274 are associated with respective VMs 231-234. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-B in FIG. 2, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Hosts 210A-B may also maintain data-plane connectivity with each other via physical network 205 to facilitate communication among VMs 231-234. Hypervisor 214A/214B may each implement virtual tunnel endpoint (VTEP) to encapsulate and decapsulate packets with an outer header (also known as a tunnel header) identifying the relevant logical overlay network (e.g., VNI). Any suitable tunneling protocol, such as Virtual eXtensible Local Area Network (VXLAN), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer-2 physical networks.

To protect VMs 231-234 against potential security threats, hypervisor 214A/114B may implement distributed firewall (DFW) engine 219A/219B to filter packets to and from associated VMs 231-234. For example, at host-A 210A, hypervisor 214A implements DFW engine 219A to filter packets for VM1 231 and VM2 232. SDN controller 280 may be used to configure firewall rules that are enforceable by DFW engine 219A/119B. Packets may be filtered according to firewall rules at any point along the datapath from a source (e.g., VM1 231) to a physical NIC (e.g., 224A). In one embodiment, a filter component (not shown) may be incorporated into each VNIC 241-244 to enforce firewall rules configured for respective VMs 231-234. The filter components may be maintained by respective DFW engines 219A-B.

Application Security Enforcement

According to examples of the present disclosure, attackers and attack traffic may be selectively indulged using second server pool 140 that is isolated from first server pool 130. This increases the probability of discovering new and evolving attack vectors and attack patterns to improve application security enforcement. Examples of the present disclosure may be implemented to facilitate early detection and mitigation of attacks across the network surface to improve data protection and trust integrity as well as to minimize application downtime.

As used herein, the term "security attack" may refer generally to a malicious activity to cause hard or damage to entity or entities (e.g., application servers) deployed in a network environment. For example, a security attack may be designed to gain unauthorized access to resource(s) or service(s) in order to steal, damage or expose information from application server(s). The term "application server" may refer generally to a physical or virtual entity running application(s) capable of packet processing. The term "server pool" may refer generally to a collection or group of servers, which may be deployed in the same geographical location or dispersed geographical locations.

Figure 3:
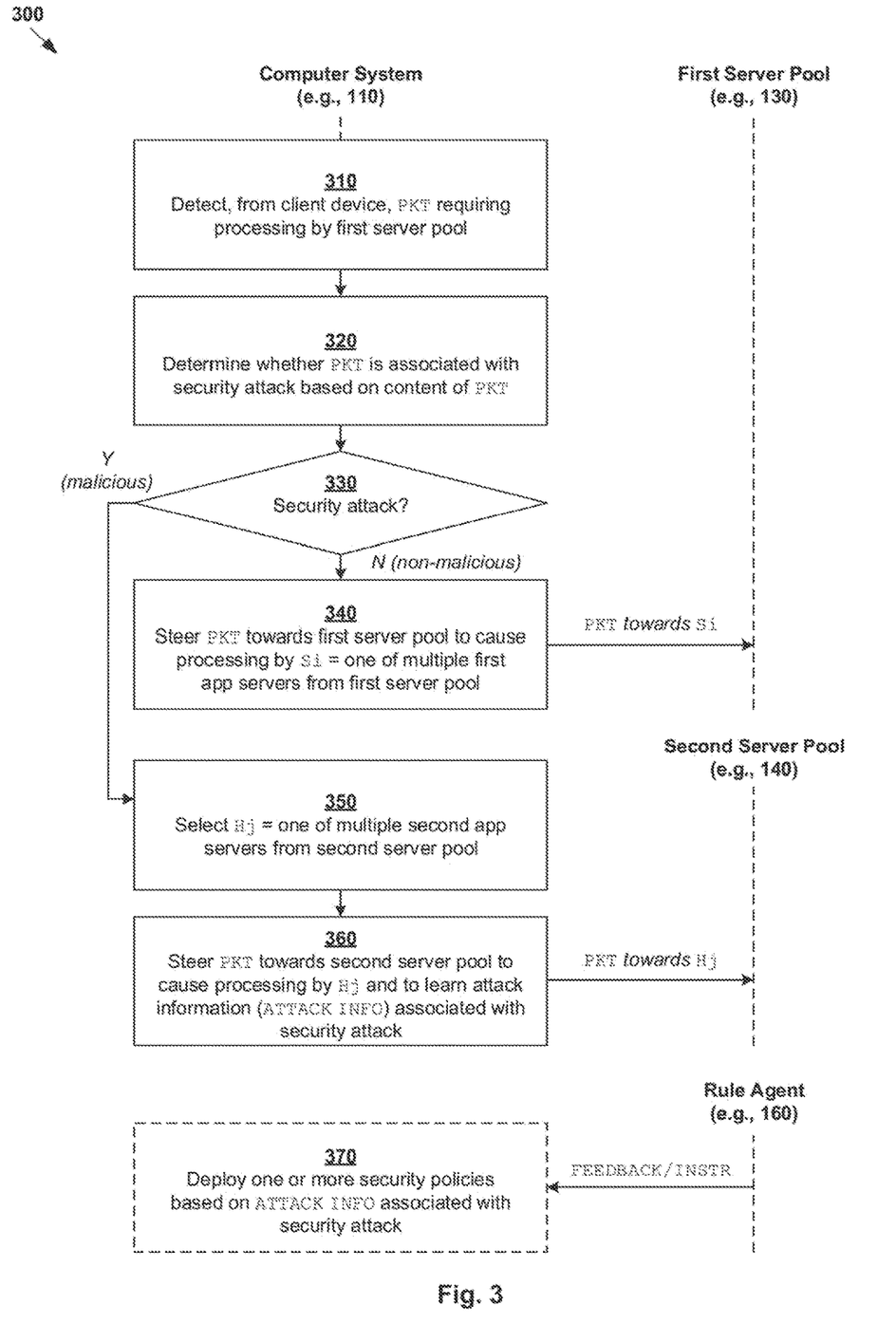
FIG. 3 is a flowchart of an example process for a computer system to perform application security enforcement.

In more detail, FIG. 3 is a flowchart of example process 300 for a computer system to perform application security enforcement in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Examples of the present disclosure may be implemented using any suitable computer system 110, which may support multiple security tiers according to a multi-tier architecture (to be discussed using FIGS. 4-6). In the following, example process 300 will be discussed using the example in FIG. 1.

At 310 in FIG. 3, computer system 110 may detect, from client device 120/122, packet 170/180 requiring processing by first server pool 130 that includes multiple first application servers 131-13N (Si, where i=1, . . . , N). Each first application server (Si) may implement any suitable application(s) capable of packet processing, such as to process service requests and respond with service responses.

At 320 in FIG. 3, computer system 110 may determine whether packet 170/180 is associated with a security attack based on content of the packet (e.g., header and/or payload information). For example in FIG. 1, first packet=P1 170 from first client device 120 (operated by genuine user 121) is not determined to be associated with the security attack. In contrast, second packet=P2 180 from second client device 122 (operated by attacker 123) is determined to be associated with the security attack.

As will be discussed using FIGS. 4-6, computer system 110 may support multiple security tiers according to a multi-tier architecture. In this case, block 320 may involve a first security tier (e.g., tier 510/511 in FIG. 5) matching the content of the packet to at least one of multiple security policies (e.g., firewall rules, list of attacker IP addresses). Based on at least one matching security policy, it is determined that the packet is associated with the security attack. The packet may be steered towards a second security tier (e.g., 512 in FIG. 5) supported by computer system 110 for subsequent steering towards second server pool 140.

At 330 (no) and 340 in FIG. 3, in response to determination that first packet=P1 170 is not associated with the security attack, first packet=P1 170 may be steered towards first server pool 130. This is to cause processing of the packet by a particular first application server (e.g., S1 131) selected from multiple first application servers 131-13N in first server pool 130.

At 330 (yes) and 350 in FIG. 3, in response to determination that second packet=P2 180 is associated with the security attack, a particular second application server (Hj) may be selected from multiple second application servers 141-14M in second server pool 140. Second application servers 141-14M are capable of mimicking behavior of first application servers 131-13N in first server pool 130.

At 360 in FIG. 3, second packet=P2 180 may be steered towards second server pool 140 to cause processing by the particular second application server (e.g., H1 141) and to learn attack information associated with the security attack. This way, examples of the present disclosure may be implemented to indulge attacker 123 associated with client device 122 while isolating the second packet from first server pool 130. In practice, attacker 123 may be a human or computer-implemented attacker. Also, it is not necessary to steer each and every malicious packet towards second server pool 140. Some malicious packets (e.g., possibly with known attack vectors and attack patterns) may be blocked and dropped.

Depending on the desired implementation, at 370 in FIG. 3, one or more security policies may be deployed on computer system 110 based on the attack information associated with the security attack. For example, a security policy may be deployed to perform one or more of the following: rate limiting for attack traffic, lower a class of service for attack traffic, increase monitoring of attack traffic for a predetermined period of time, update a mode (e.g., detection, enforcement, selective monitoring) or paranoia level (e.g., low, medium, high or extreme) implemented by computer system 110.

Any suitable attack information may be learned according to examples of the present disclosure. In one example, the second security tier may learn attack information specifying one or more of the following: attacker's address information, the matching security policy and timestamp information. Additionally or alternatively, one or more of the following may be learned using second server pool 140: attacker's address information (e.g., IP address, geographical location), attack type information, attack severity information and attack signature information. For example in FIG. 1, rule agent 160 may be deployed to perform an analysis of attack information (see 190-191), which may be stored in attack and rule database 150. Various examples will be discussed below.

Multi-Tier Security Architecture

Network security has historically been an arms race; a battle waged between two ever advancing factions—attackers and network security appliances. Security appliances have evolved since their introduction as rudimentary Access Control Lists (ACLs) to sophisticated application specific WAFs and have more recently employed the use of learning machines. The number of web-hosted applications and services is increasing exponentially and permeating all aspects of everyday life. As such, more personal and private information is involved making the impact of an exploit so much more severe. This security evolution is only indicative of advances in the complexity of attacks and the ingenuity of attackers. Conventionally, application security defense arsenal may be enabled by systematic study of attacks, employing an army of security researchers combing through application surface to identify vulnerabilities. While this approach may have been beneficial in the past, the prevailing attack landscape requires a more proactive approach to application security.

In practice, application security is an expensive (if not the most expensive) component of a packet processing pipeline. There are various implications of application security, such as in terms of performance, expenditure, research and training, application diversity, etc. In relation to performance, a higher security level has a higher impact on performance, such as higher latency, longer response time, lower throughput, etc. In relation to expenditure, a higher security level requires more capital expenditure (CapEx) and operational expenditure (OpEx) and diverse commercial licenses for different security demands. In relation to research and training, it is generally difficult to acquire application-specific attack vectors and attack patterns to create new signatures or to update existing signatures. In relation to application diversity, every application and its attacks may be unique.

Examples of the present disclosure may be implemented to learn new attack vectors and attack patterns in a more active manner; provide research and training data for offline analysis; develop defenses against new attacks and autonomously augment existing defense mechanisms; identify attackers and extend security perimeter to the edge of network environment 100. In practice, an application security architecture that is realized using examples of the present disclosure may be known as "Evolving Load Balancer with Active (ELBA) application security." For example, ELBA may be implemented to enforce application security, whilst enabling discovery of application vulnerabilities and also attacker identification. This facilitates autonomous development and augmentation of existing defense mechanisms for newly discovered attacks. This way, attacks that constantly evolving may be identified to improve the security envelope across the entire attack surface.

Some examples will be discussed using FIGS. 4-5. FIG. 4 is a flowchart of example process 400 of application security enforcement in SDN environment 100. Example process 400 may include one or more operations, functions, or actions illustrated at 410 to 480. The various operations, functions or actions may be combined into fewer blocks, divided into additional blocks, and/or eliminated depending on the desired implementation. FIG. 5 is a schematic diagram illustrating first example 500 of application security enforcement. Examples of the present disclosure may be implemented using any suitable application security enforcement system that includes computer system 110, first server pool 130, second server pool 140, attack and rule database 150 and rule agent 160.

(a) Configuration

Figure 4:
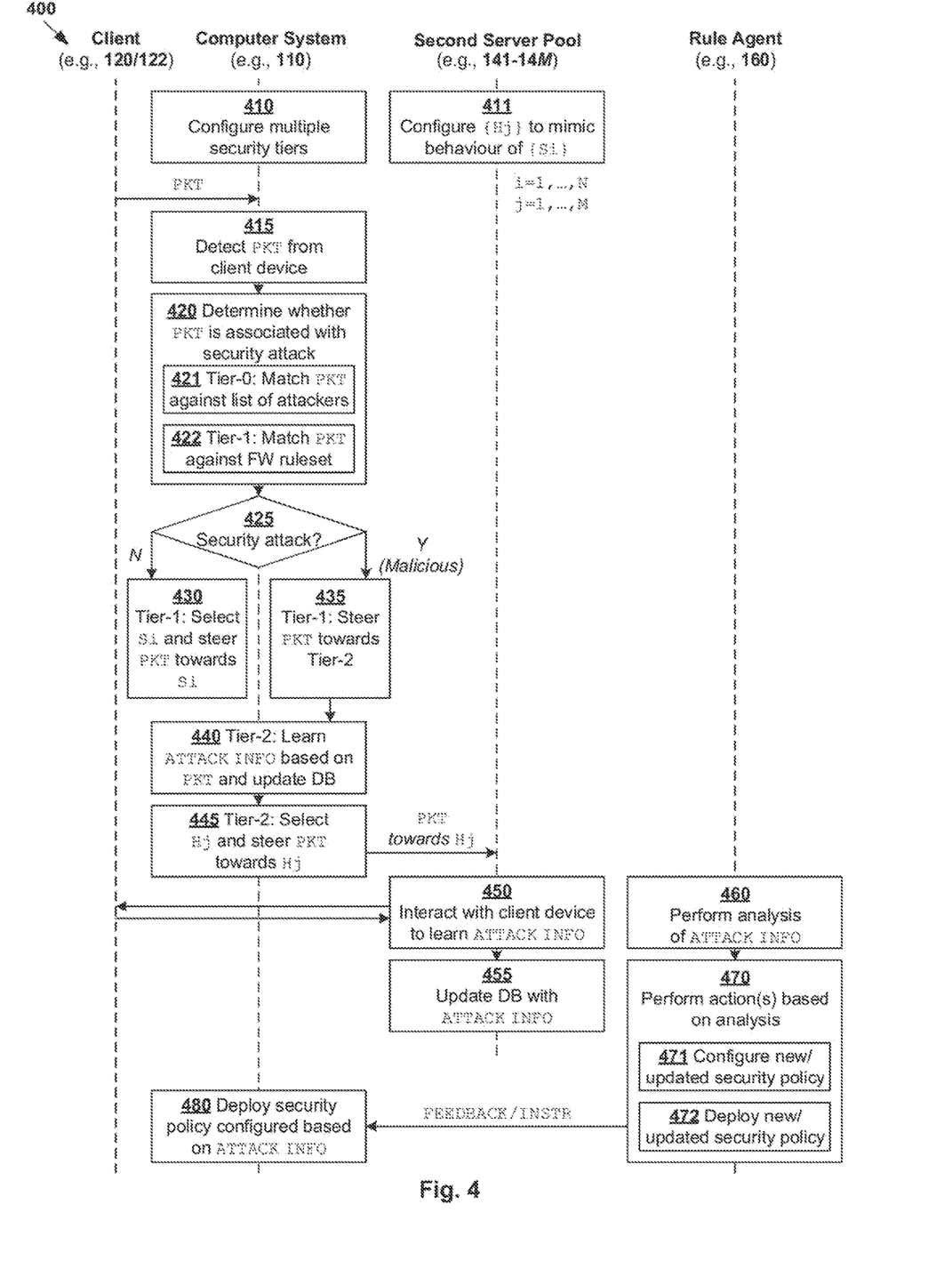
FIG. 4 is a flowchart of an example detailed process for application security enforcement.

At 410 in FIG. 4, computer system 110 may be configured to include multiple security tiers to implement a learning and evolving application security solution that is built on principles of SDN networking (exemplified using FIG. 2). In practice, any suitable number of tiers may be configured, such as tier-0, tier-1 and tier-2 in FIG. 5.

Figure 5:
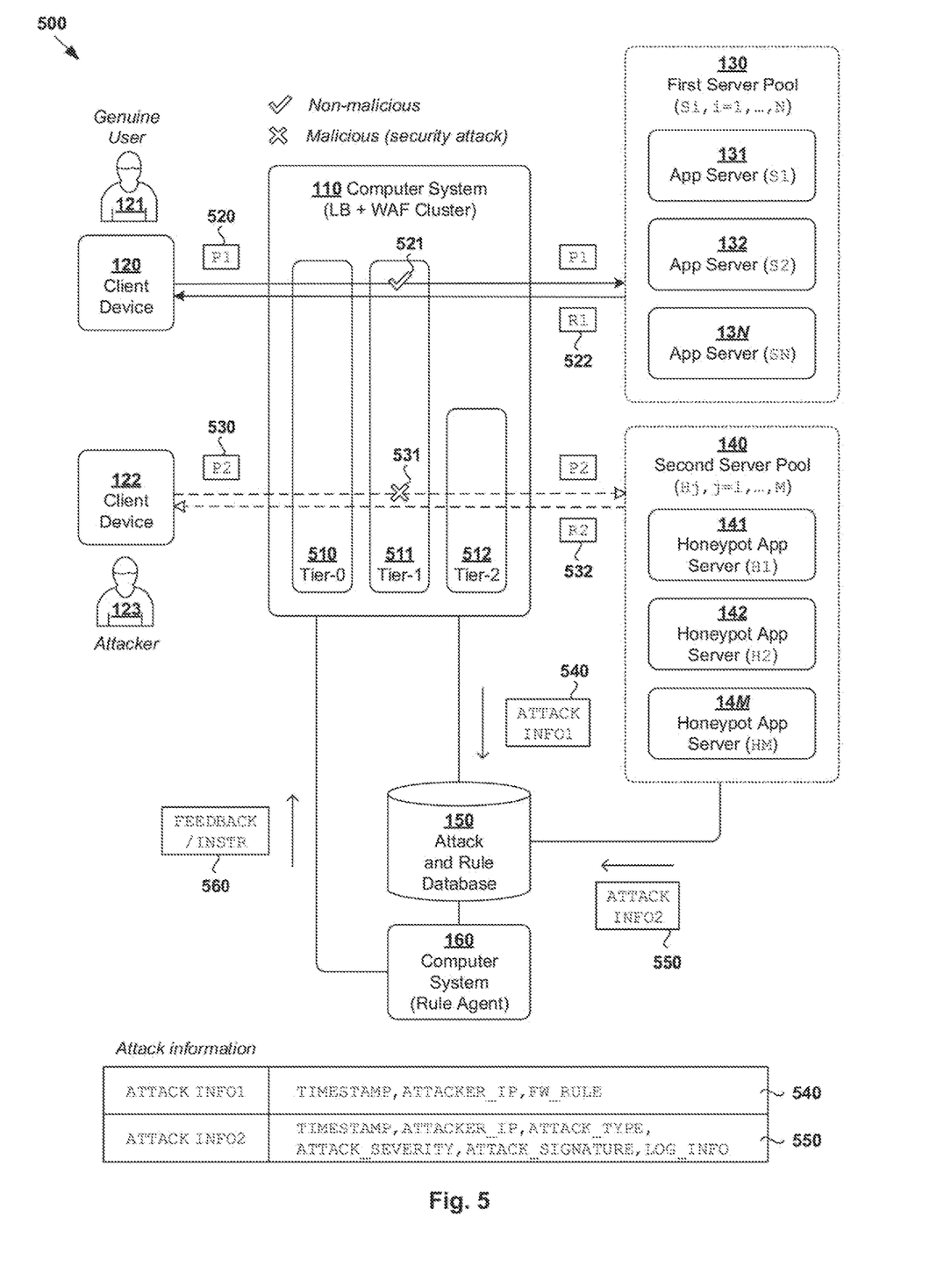
FIG. 5 is a schematic diagram illustrating first example of application security enforcement.

At 510 in FIG. 5, tier-0 may be configured to implement IP-based perimeter security and traffic segmentation, such as using edge appliance(s) deployed at the edge of a data center. Tier-0 510 may implement any suitable security policy, such as a policy that identifies a list of attackers using respective client-specific identifiers (IDs). For example, a particular client-specific ID that uniquely identifies a client or client request may be a client source IP address (SIP), client source port number, application cookie information, request hash information or signature, or any combination thereof, etc. An attack may be identified by matching a client-specific ID associated with an incoming packet to the list of attackers.

At 511 in FIG. 5, tier-1 may be configured to include a single or scaled-out load balancer and WAF cluster. In general, a WAF is configured to protect web applications by inspecting and blocking malignant traffic, such as HyperText Transfer Protocol (HTTP) traffic, etc. For example, WAF may offer protection to web applications from security vulnerabilities identified by the Open Web Application Security Project (OWASP) such as cross-site forgery, cross-site scripting (XSS), file inclusion, structured query language (SQL) injection, etc.

Depending on the desired implementation, a WAF on tier-1 511 may be configured to operate in a "selective detection" mode, as opposed to an enforcement mode that blocks all malicious traffic. In the selective detection mode, firewall rules may be matched to an incoming packet according to any suitable order. One example involves runtime least recently used (LRU) reordering of frequently flagged rules to reduce latency and improve performance. The selective detection mode may also help reduce resource consumption on tier-1 511 such that more resources may be dedicated to serve genuine traffic.

At 512 in FIG. 5, tier-2 may be configured to include one or more load balancer and WAF clusters. For example, a WAF on tier-2 512 may operate in a "detection" mode at paranoia level=extreme. In the detection mode, tier-2 512 may implement security policies in the form of firewall rules and push attack information identifying matching firewall rule(s) towards attack and rule database 150.

(b) Incoming Packet Handling

At 415-420 in FIG. 4, in response to detecting an incoming packet from client device 120/122, computer system 110 may determine whether the packet is associated with a security attack by applying one or more security policies. In one example, block 420 may involve tier-0 510 determining whether the packet originates from an attacker from a list of attacker IP addresses. Additionally or alternatively, block 420 may involve tier-1 511 matching the packet to firewall rule(s). Each firewall rule may specify (a) match field(s) specifying packet header and/or payload information to be matched with the packet and (b) an action to be performed if there is a match. See 421-422 in FIG. 4.

For example, to detect an XSS attack, tier-1 511 may compare the incoming packet (e.g., HTTP request) with a core rule set (CRS) firewall rule with (1) match fields ="SecRule ARGS|REQUEST_HEADERS "@rx<script>" id:101, msg: 'XSS Attack', severity:ERROR" and (2) action=steer towards tier-2 512. The CRS rule is configured to inspect a HTTP request with arguments (see "ARGS") and request headers (see "REQUEST_HEADERS") by performing a regular expression (see "rx" indicating "regex") match for specific keyword(s). If a keyword (see "<script>") is matched, tier-1 511 may determine or classify the incoming packet to be malicious (i.e., XSS attack). Otherwise, the incoming packet is determined to be non-malicious.

At 425 (no) and 430 in FIG. 4, in response to determination that the incoming packet is non-malicious, tier-1 511 may steer the packet towards a first application server (e.g., S1 131) from first server pool 130. S1 131 may be selected based on any suitable load balancing algorithm, such as round robin, hash function, etc. For example in FIG. 5, first packet=P1 520 from first client device 120 is not associated with a security attack (see 521). In this case, P1 520 is steered towards S1 131, which performs any suitable packet processing and respond with a first response=R1 521 (e.g., service response).

Otherwise, at 425 (yes) and 435 in FIG. 4, in response to determination that the incoming packet is associated with a security attack, tier-1 511 may steer the packet towards tier-2 512. For example in FIG. 5, second packet=P2 530 is determined to be a malicious packet (see 531) from second client device 122 operated by attacker 123. In this case, P2 530 is steered towards tier-2 512, which operates in a detection mode with security paranoia level=extreme.

In practice, the multi-tier architecture may be implemented for various cost and/or performance benefits. For example, since only attack traffic is served, tier-2 512 may be implemented by a more cost-effective instance (e.g., single instead of multiple CPU cores). Also, by steering the attack traffic towards tier-2 512, CPU cycles on tier-1 511 may be better utilized to serve genuine traffic while protecting first server pool 130 from security attacks.

At 440 in FIG. 4, tier-2 512 may learn first attack information (see "ATTACK INFO1" in FIGS. 4-5) associated with second packet=P2 530 and update attack and rule database 150 accordingly. In the example in FIG. 5, ATTACK INFO1 540 may include a timestamp information associated with P2 530, attacker's address information (e.g., SIP) associated with client device 122, matching security policy (e.g., firewall rule(s)) flagged by tier-1 511, etc.

Further, at 445 in FIG. 4, tier-2 512 may steer P2 530 towards a selected second application server (e.g., H1 141) from second server pool 140. H1 141 may be selected based on any suitable load balancing algorithm, such as round robin, hash function, etc. As will be discussed below, H1 141 may interact with client device 122 to learn attack information associated with the security attack, such as attack strategy used by attacker 123, etc. This is to indulge attacker 123 operating client device 122 while isolating P2 530 from first server pool 130 and without compromising the security of (genuine) application servers 131-13N.

In the example in FIG. 5, tier-1 511 operating in "extreme" paranoia level may identify attacker 123, who is added to an attackers list. Tier-1 511 may then be augmented with more prevalent CRS rule as flagged by tier-2 512. In addition, tier-1 511 may perform runtime LRU reordering of 'flagged' rules, ensuring the most frequently hit rules are at the top of the search sequence. This attacker information may be provided to tier-1 511 as well as a network edge, where the traffic is isolated out to a separate virtual local area network (VLAN), rate limited or blocked.

Honeypot Application Servers (a) Configuration

At 411 in FIG. 4, honeypot application servers 141-14M may be configured to form second server pool 140 (also known as an attack pool) for serving attackers. Each honeypot application server may be configured to mimic behavior of first application server(s) from first server pool 130. In some cases, honeypot application server(s) may be configured to perform threat analysis, which may be leveraged to learn more about the attacker's strategy.

Any suitable honeypot application server (Hj) may be deployed, such as a commercial server, free and open source software (FOSS) server, custom server, etc. Custom (homegrown) honeypot server(s) may be deployed to learn vulnerabilities associated with first application servers 131-13N and build better security solutions. In one example, first application servers 131-13N that serve genuine users may be production servers. Second application servers 141-14M serving attackers may be staging and/or test application servers capable of mimicking the production servers when interacting with client device 120/122.

(b) Indulging Attackers

At 450 in FIG. 4, in response to detecting second packet=P2 530 from tier-2 512, honeypot application server=H1 141 may interact with client device 122 to learn second attack information (see "ATTACK_INFO2" in FIGS. 4-5). In the example in FIG. 5, H1 141 may mimic the behavior of application server(s) in first server pool 130 by responding to P2 530 with response packet=R2 532. Any suitable rounds of interaction with client device 122 may be performed by H1 141 to ensure that attacker 123 is agnostic to any differential treatment. This also encourages attacker 123 to reveal their attack strategy without compromising the security of first server pool 130.

At 455 in FIG. 4, H1 141 may update attack and rule database 150 with ATTACK_INFO2 (see 550 in FIG. 5) for subsequent analysis by rule agent 160. ATTACK_INFO2 550 may include timestamp information, an attacker's address information (e.g., SIP associated with client device 122), attack type information, attack severity information and attack signature information, log information, etc.

In practice, commercial and/or FOSS honeypot application servers may generate ATTACK_INFO2 550 that includes log information to facilitate information extraction and learning by rule agent 160. Custom honeypot application servers may aid in the discovery of new attack patterns and use representational state transfer (REST) application programming interface (API) published by rule agent 160 to add entries to attack and rule database 150.

Rule Agent

At 460 in FIG. 4, rule agent 160 may perform an analysis of attack information stored in attack and rule database 150, including ATTACK_INFO1 540 learned using tiers 510-512 at block 440 and ATTACK_INFO2 550 learned using honeypot server(s) at block 450. In practice, rule agent 160 may be a learning engine that is configured to harness intelligence derived from identity of attackers and attack strategies to generate new security policies.

The analysis at block 460 may be performed to increase the probability of learning new and evolving attack vectors, attack patterns and attack signatures to improve application security. As used herein, the term "attack vector" may refer generally to a mode of attack, such as port scans, cross scripting, SQL injection, etc. The term "attack pattern" may refer generally to behavioral pattern(s) of an attacker, such as time of day, browser signature, behavioral traffic pattern, etc. The term "attack signature" may refer generally to a characterization of an attack. For example, SQL injection attacks may be characterized by a set of signatures (including "OR") in queries. Attack signatures are typically used to formulate CRS firewall rules.

At 470 in FIG. 4, rule agent 160 may perform action(s) based on the analysis of attack information 540/550. For example, this may involve configuring new or updated security policy or policies (e.g., CRS rules) to improve application security.

Using a feedback mechanism, rule agent 160 may instruct computer system 110 to deploy the new or updated security policy. See 471-472 and 480 in FIG. 4.

For example in FIG. 5, based on the analysis, attacker 123 associated with IP address=72.3.4.5 may be detected to have launched 20 attacks per day on average, including 4 attacks with severity level=1. In this case, rule agent 160 may generate and send a feedback or instruction (see 560) to deploy a new or updated security policy on computer system 110. A first example security policy may be deployed to redirect traffic from attacker's IP address=72.3.4.5 on a VXLAN/GENEVE tunnel towards second server pool 140. A second example security policy may be deployed to cause computer system 110 to perform rate limiting or to lower a class of service for traffic from attacker's IP address=72.3.4.5.

A third example security policy may be deployed to cause computer system 110 to increase traffic monitoring on attacker's IP address=72.3.4.5 during a particular period of suspicious activity, such as using IP Flow Information Export (IPFIX), sFlow, etc. A fourth example security policy may be deployed to cause computer system 110 to block all traffic from IP address=72.3.4.5 for a predetermined period of time (e.g., in the next hour). In a further example, rule agent 160 may also identify frequently flagged firewall rules and augment lower-grade firewall rules. In this case, instruction 560 may cause computer system 110 to update a mode or a paranoia level, such as to migrate "extreme" CRS rule set to a lower paranoia level to improve efficacy while limiting performance impact.

Additionally or alternatively (not shown in FIG. 4), rule agent 160 may perform one or more of the following actions at block 465: (a) perform IP reputation check to qualify the clients and update IP reputation database with IP addresses of attackers; (b) perform IP geolocation check to qualify and enforce geographic restrictions; (c) detect anomalies based on time of day, traffic originating from behind iron curtains, abnormal application access patterns, etc.; (d) employ artificial intelligence or machine learning techniques to mine for additional actionable intelligence; and (e) enhance edge security using information garnered from all of the above (also serves as further research and training data).

Additionally or alternatively (not shown in FIG. 4), rule agent 160 may supplement participating networking Infrastructure-as-a-service (IaaS) elements in network environment 100 to perform rate limiting, network isolation, etc. This facilitates attack detection, attack traffic isolation, faster mitigation with lower application latency overhead. Using examples of the present disclosure, security defenses may be improved, such as from the network edge to application tier(s); owing to programmability at different tiers.

Using examples of the present disclosure, rule agent 160 may provide rich information on attackers, attack vectors and attack metrics. Rule agent 160 may characterize security attacks by inferring "severity" from the matched rules of the CRS rule set and generates a histogram for number of attacks and severity. The perceived "severity" may be augmented with additional intelligence gathered from honeypot servers 141-14M to facilitate the identification and discovery of malicious patterns. Note that conventional approaches generally assume IP addresses to be the unique identifier of a client although other unique identifiers may be used, such as username, cookie, universally unique identifier (UUID), etc.

Further Example Implementation(s)

Figure 6:
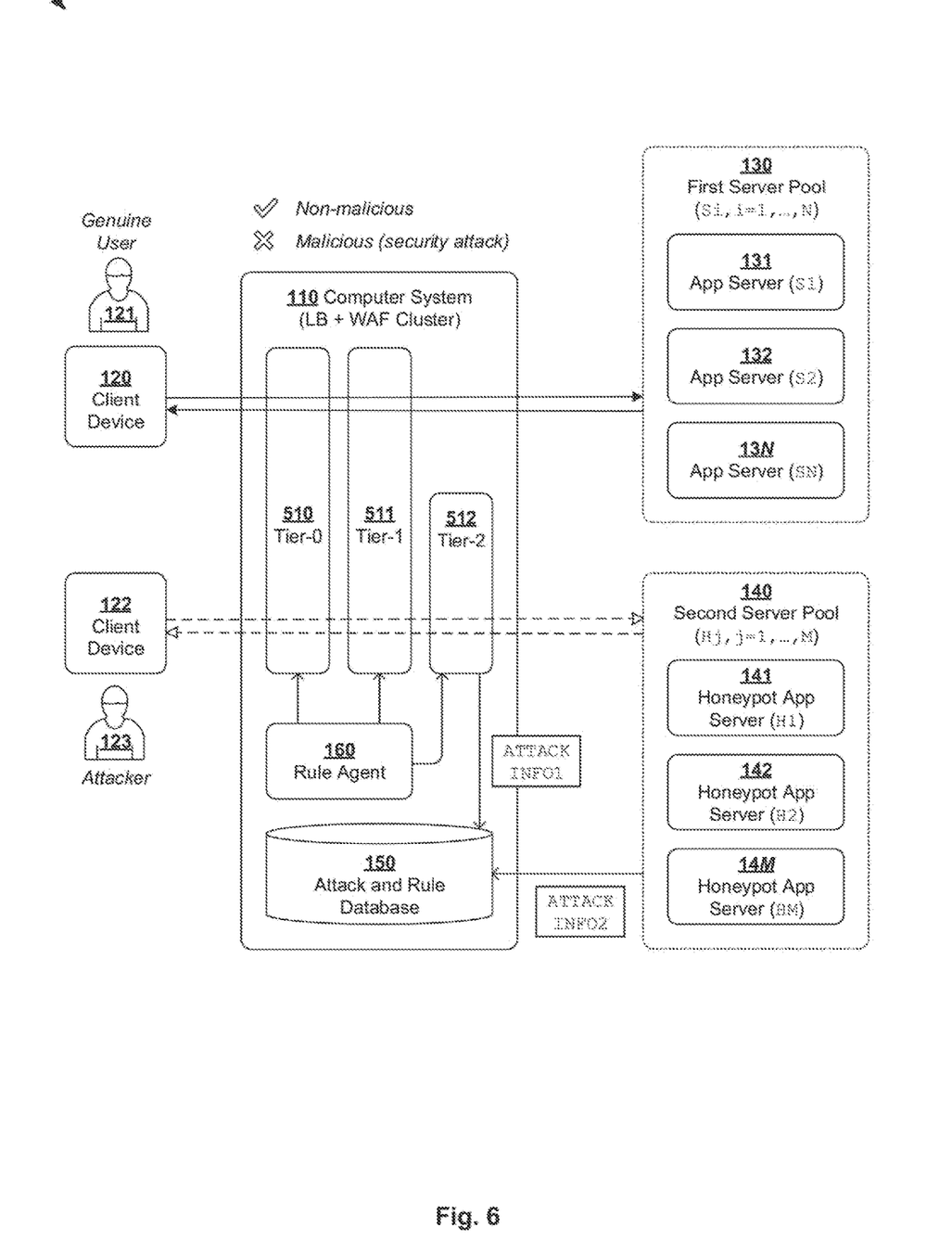
FIG. 6 is a schematic diagram illustrating second example of application security enforcement.

FIG. 6 is a schematic diagram illustrating second example 600 of application security enforcement. In this example, rule agent 160 may be supported by computer system 110 together with security tiers 510-512. Similar to the example in FIG. 5, security tier-2 512 and second server pool 140 may learn attack information associated with security attack(s) and push the attack information to attack and rule database 150. Rule agent 160 may perform an analysis of the attack information to, for example, deploy new or updated security policies on security tiers 510-512. Various examples discussed using FIGS. 1-5 are applicable here and will not be repeated for brevity.

In practice, the combination of rule agent 160 and attack and rule database 150 may be deployed independently as a Software-as-a-Service (SaaS). This model enables disparate local and global deployments receive real time updates to improve the overall security capability of the solution. Examples of the present disclosure may be implemented at the edge of network environment 100 to steer attack traffic towards second server pool 140, and integrated with any suitable intelligence platform (e.g., VMware NSX® Intelligence) to provide a single-pane-of-glass view of the deployment. Applications such as global server load balancing (GSLB) may be utilize information on attackers' IP addresses to perform differential selection, etc. A forward feedback may be provided to update to public IP reputation databases (e.g., MaxMind).

Client State Transitions

Figure 7:
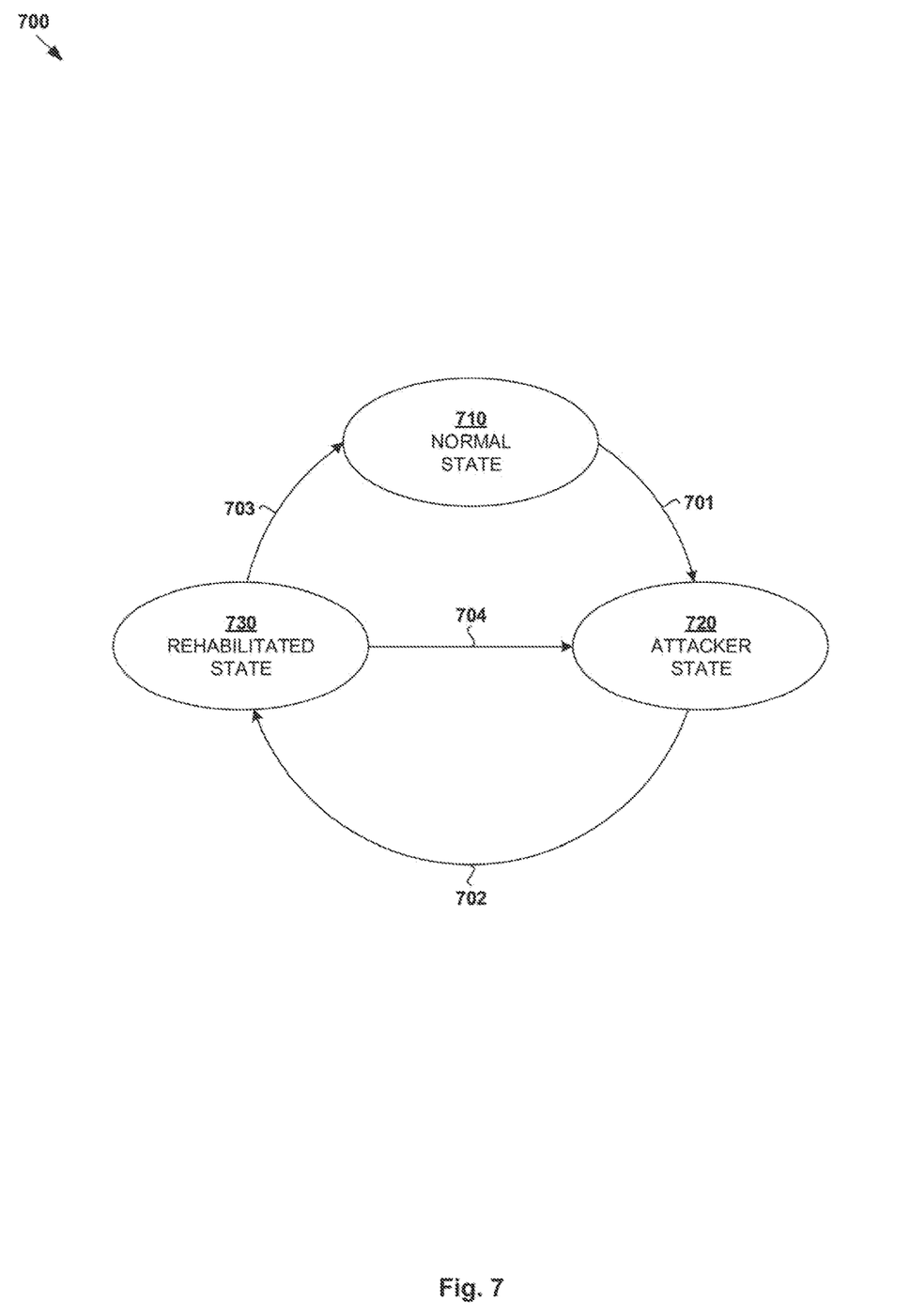
FIG. 7 is a schematic diagram illustrating an example of client state transitions during application security enforcement.

FIG. 7 is a schematic diagram illustrating example 700 of client state transitions during application security enforcement. In this example, rule agent 160 may implement a client remediation state machine to distinguish genuine normal users from attackers and also to rehabilitate attackers. In this case, client device 120/122 may be assigned with one of several states indicating their role, such as NORMAL (see 710), ATTACKER (see 720) and REHABILITATED (see 730).

At 710 in FIG. 7, a client (e.g., client device 120 operated by genuine user 121) may be assigned with state=NORMAL. If a security attack is detected from the client at any point in time, its state may be transitioned to ATTACKER (see 701).

At 720 in FIG. 7, a client (e.g., client device 122 operated by attacker 123) associated with a security attack may be assigned with state=ATTACKER. After a configurable period of time and if no further attack originates from this client, rule agent 160 may transition the state from ATTACKER to REHABILITATED (see 702).

At 730 in FIG. 7, a client (e.g., client device 122 operated by attacker 123) may be assigned with state=REHABILITATED where the client spends a period of "probation time" with a lowered class of service and are subject to resource restrictions. Their benign requests, however, may be steered towards first application servers 131-13N from first server pool 130.

Once the probation period is served without further security attack, rule agent 160 may transition the state from REHABILITATED to NORMAL (see 703). Otherwise, if a security attack is detected during the probation period, the state is transitioned to ATTACKER instead (see 704). In the event of a false positives, the client may be remediated through a state transition to NORMAL.

Container Implementation

Although explained using VMs 231-234, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 231-234. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a computer system to perform application security enforcement, wherein the method comprises:
   detecting, from a client device, a packet requiring processing by a first server pool that includes multiple first application servers;
   based on content of the packet, determining whether the packet is associated with a security attack; and
   in response to determination that the packet is not associated with the security attack, steering the packet towards the first server pool to cause processing of the packet by one of the multiple first application servers;
   otherwise, in response to determination that the packet is associated the security attack,
      learning a first attack information associated with the packet;
      selecting, from a second server pool, one of multiple second application servers that are capable of mimicking behavior of the multiple first application servers in the first server pool;
      steering the packet towards the second server pool to cause processing of the packet by the one of multiple second application servers and to learn second attack information associated with the security attack by the one of multiple second application servers, thereby indulging an attacker associated with the client device while isolating the packet from the first server pool; and
      deploying a security policy based on an analysis of the first attack information and the second attack information.

2. The method of claim 1, wherein determination that the packet is associated the security attack comprises:
   matching, by a first security tier supported by the computer system, the content of the packet to at least one of multiple security policies; and
   based on at least one matching security policy, determining that the packet is associated with the security attack and steering the packet towards a second security tier supported by the computer system.

3. The method of claim 2, wherein learning the first attack information comprises:
learning, by the second security tier, one or more of the following: attacker's address information, the matching security policy and timestamp information specified in the first attack information.

4. The method of claim 1, wherein steering the packet towards the second server pool comprises:
steering the packet towards the second server pool to cause the one of multiple second application servers to learn the second attack information specifying one or more of the following: attacker's address information, attack type information, attack severity information and attack signature information.

5. The method of claim 1, wherein the method further comprises:
deploying the security policy to perform one or more of the following: rate limiting for attack traffic, lower a class of service for attack traffic, increase monitoring of attack traffic for a predetermined period of time and update a paranoia level implemented by the computer system.

6. The method of claim 1, wherein the method further comprises:
deploying the security policy in response to a feedback or instruction from a rule agent capable of performing the analysis of the first attack information and the second attack information to discover attack vectors and attack patterns.

7. A non-transitory computer-readable storage medium that includes a set of instructions which, in response to execution by a processor of a computer system, cause the processor to perform a method of application security enforcement, wherein the method comprises:
detecting, from a client device, a packet requiring processing by a first server pool that includes multiple first application servers;
based on content of the packet, determining whether the packet is associated with a security attack; and
in response to determination that the packet is not associated with the security attack, steering the packet towards the first server pool to cause processing of the packet by one of the multiple first application servers;
otherwise, in response to determination that the packet is associated the security attack, learning a first attack information associated with the packet;
selecting, from a second server pool, one of multiple second application servers that are capable of mimicking behavior of the multiple first application servers in the first server pool;
steering the packet towards the second server pool to cause processing of the packet by the one of multiple second application servers and to learn second attack information associated with the security attack by the one of multiple second application servers, thereby indulging an attacker associated with the client device while isolating the packet from the first server pool; and
deploying a security policy based on an analysis of the first attack information and the second attack information.

8. The non-transitory computer-readable storage medium of claim 7, wherein determination that the packet is associated the security attack comprises:
matching, by a first security tier supported by the computer system, the content of the packet to at least one of multiple security policies; and
based on at least one matching security policy, determining that the packet is associated with the security attack and steering the packet towards a second security tier supported by the computer system.

9. The non-transitory computer-readable storage medium of claim 8, wherein learning the first attack information comprises:
learning, by the second security tier, one or more of the following: attacker's address information, the matching security policy and timestamp information specified in the first attack information.

10. The non-transitory computer-readable storage medium of claim 7, wherein steering the packet towards the second server pool comprises:
steering the packet towards the second server pool to cause the one of multiple second application servers to learn the second attack information specifying one or more of the following: attacker's address information, attack type information, attack severity information and attack signature information.

11. The non-transitory computer-readable storage medium of claim 7, wherein the method further comprises:
deploying the security policy to perform one or more of the following: perform rate limiting for attack traffic, lower a class of service for attack traffic, increase monitoring of attack traffic for a predetermined period of time and update a paranoia level associated with the security policy.

12. The non-transitory computer-readable storage medium of claim 7, wherein the method further comprises:
deploying the security policy in response to a feedback or instruction from a rule agent capable of performing the analysis of the first attack information and the second attack information to discover attack vectors and attack patterns.

13. A system for application security enforcement, comprising:
a first server pool that includes multiple first application servers;
a second server pool that includes multiple second application servers capable of mimicking behavior of the multiple first application servers in the first server pool;
a computer system including a processor configured to:
detect, from a client device, a packet requiring processing by the first server pool that includes the multiple first application servers;
based on content of the packet, determine whether the packet is associated with a security attack; and
in response to determination that the packet is not associated with the security attack, steering the packet towards the first server pool to cause processing of the packet by one of the multiple first application servers;
otherwise, in response to determination that the packet is associated the security attack, learn a first attack information associated with the packet, steer the packet towards the second server pool to cause processing of the packet by one of multiple second application servers and to learn second attack information associated with the security attack by the one of multiple second application servers, thereby indulging an attacker associated with the client device while isolating the packet from the first server pool, and deploy a security policy based on an analysis of the first attack information and the second attack information.

14. The system of claim 13, wherein the computer system is configured to determine that the packet is associated the security attack by performing the following:
   match, by a first security tier supported by the computer system, the content of the packet to at least one of multiple security policies; and
   based on at least one matching security policy, determine that the packet is associated with the security attack and steering the packet towards a second security tier supported by the computer system.

15. The system of claim 14, wherein the first attack information
   specifies one or more of the following: attacker's address information, the matching security policy and time-stamp information.

16. The system of claim 13, wherein the computer system is configured to steer the packet towards the second server pool by performing the following:
   steer the packet towards the second server pool to cause the one of multiple second application servers to learn the second attack information specifying one or more of the following: attacker's address information, attack type information, attack severity information and attack signature information.

17. The system of claim 13, wherein the computer system is further configured to:
   deploy the security policy to perform one or more of the following: perform rate limiting for attack traffic, lower a class of service for attack traffic, increase monitoring of attack traffic for a predetermined period of time and update a paranoia level associated with the security policy.

18. The system of claim 13, wherein the computer system is further configured to:
   deploy the security policy in response to a feedback or instruction from a rule agent capable of performing the analysis of the first attack information and the second attack information to discover attack vectors and attack patterns.

* * * * *